Figure 1:
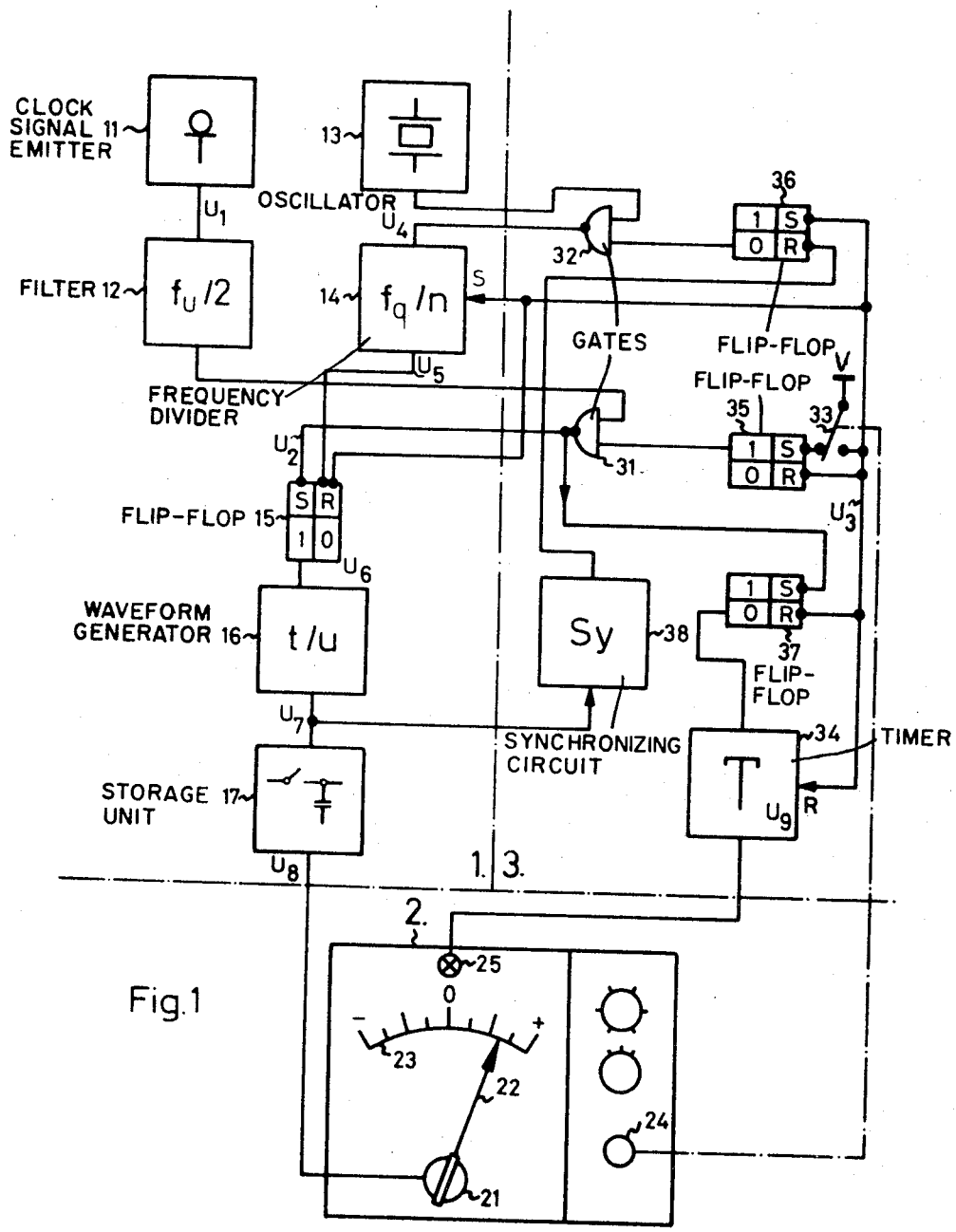

United States Patent [19]

Bolliger

[11] 3,756,066
[45] Sept. 4, 1973

[54] METHOD AND APPARATUS FOR TESTING TIMEPIECES

[75] Inventor: Fritz Bolliger, Aarwangen, Switzerland

[73] Assignee: Greiner Electronic A.G., Langenthal, Switzerland

[22] Filed: Mar. 3, 1972

[21] Appl. No.: 231,672

[30] Foreign Application Priority Data
Apr. 16, 1971 Switzerland.......................... 5536/71

[52] U.S. Cl. ..................................................... 73/6
[51] Int. Cl. ............................................. G04b 17/12
[58] Field of Search .......................................... 73/6

[56] References Cited
UNITED STATES PATENTS

| | | | |
|---|---|---|---|
| 2,782,627 | 2/1957 | Hetzel...................................... | 73/6 |
| 2,844,790 | 7/1958 | Thompson et al............. | 324/186 X |
| 3,238,764 | 3/1966 | Greiner................................... | 73/6 |
| 3,370,456 | 2/1968 | Jucker ..................................... | 73/6 |
| 3,395,566 | 8/1968 | Jucker ..................................... | 73/6 |

Primary Examiner—Richard C. Queisser
Assistant Examiner—Frederick Shoon
Attorney—Lawrence E. Laubscher

[57] ABSTRACT

Method and apparatus for testing a timepiece to determine its rate (for example, in seconds per day). The testing system is adapted for use with meter means that normally integrate sawtooth voltage pulses the amplitudes of which correspond with the time intervals between corresponding clock and low-frequency standard pulses, respectively, characterized by the provision of starting means for interrupting the supply of the clock and standard pulses, means for resuming the supply of clock pulses after a first pulse interval, timer means activated upon the occurrence of the next clock pulse subsequent to said first time interval, voltage comparison synchronizing means for resuming the supply of said standard pulses at the instant the amplitude of the sawtooth pulse generated by said first clock pulse equals the zero set point of the meter, and indicator means operable by said timer means at the end of a second time interval for presenting a visual indication adjacent the meter scale, whereby the meter indication at that instant is the rate of the timepiece under test.

8 Claims, 2 Drawing Figures

METHOD AND APPARATUS FOR TESTING TIMEPIECES

In conventional watch timing devices, in order to discover the rate of clocks or watches, it is customary to rotate a dial disc until its line grid runs parallel to a dot series diagram. In a stroboscopic watch timing apparatus, the time is measured for a particular phase-displacement of the light flashes by means of a stop watch.

The complicated measures necessitated by these and similar devices are avoided when various types of direct-indicating rate measuring apparatus are used. These either operate in accordance with the basic principle of frequency-difference measuring with multiplied clock frequency, or else with the counting of high-frequency normal-frequency periods between the clock beats. Unfortunately both methods involve expensive electronic circuitry. The present invention was developed to avoid the drawbacks of the known timepiece testing apparatus.

Accordingly, a primary object of the present invention is to provide a method and apparatus for visually indicating the rate of a timepiece, (for example, in seconds/day), use being made of a conventional integrating meter that normally integrates sawtooth pulses the amplitudes of which are a function of the time intervals between corresponding clock and standard frequency pulses. In accordance with the method of the present invention, the supply of clock and standard frequency pulses to the meter is interrupted, whereupon the supply of clock pulses is resumed to cause the next clock pulse to initiate a second time interval. The supply of the standard frequency pulses is resumed when the voltage of the sawtooth pulse corresponding with the first clock pulse equals a given value that corresponds with the zero set point of the meter, whereupon the reading of the meter at the end of said second time interval is indicative of the rate of the timepiece under test.

A more specific object of the invention is to provide a timepiece testing apparatus including meter means for indicating the integrated value of the sum of a plurality of sawtooth pulses the magnitude of which is a function of the intervals between a series of clock pulses and corresponding standard frequency pulses, means for interrupting supply of the pulses to the meter for a first time interval, means for resuming the supply of clock pulses to the meter, means responsive to the next clock pulse for initiating a second timing interval, means operable when the voltage of the sawtooth pulse associated with the clock pulse reaches a given magnitude equal to the zero set point of the meter for discharging the storage means associated with said integrating meter and for resuming the supply of standard frequency pulses to the meter for signalling the end of the second timing interval, and means adjacent the meter for signalling the end of the second timing interval, whereby the meter reading at that instant is a visual indication of the rate of the timepiece under test. In the event the standard frequency pulses are produced by frequency divider means connected with a high frequency source (such as a quartz oscillator), the first time interval for interrupting the supply of clock and standard frequency pulses is preferably effected by control of the frequency divider and/or its calibration frequency feed.

Figure 2:
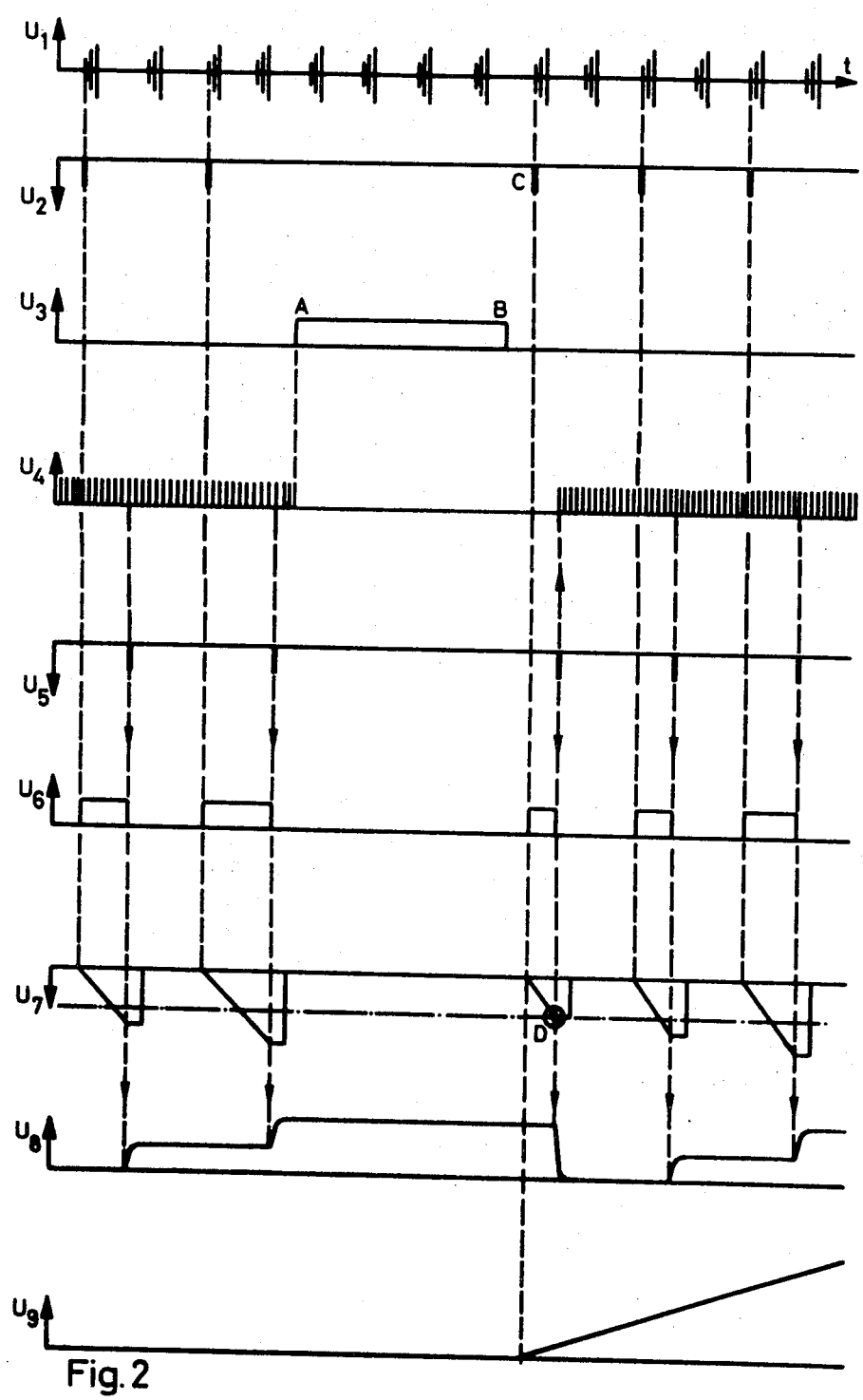

Other objects and advantages of the present invention will become apparent from a study of the following specifications when viewed in the light of the accompanying drawing, in which FIG. 1 is an electrical schematic diagram of the timepiece testing apparatus, certain components being illustrated in block diagram form; and FIG. 2 is a voltage waveform diagram illustrating the operation of the apparatus of FIG. 1.

Referring now to the drawing, the clock signal emitter 11 includes a microphone and blocking amplifier for producing clock pulses $U_1$ in response to the beats of the timpieces, which pulses are reduced in number by half by the filter 12 to produce the filtered clock pulse signal $U_2$. The clock pulses are supplied to the voltage waveform generator means 16 via a normally conductive first gate 31 and flip-flop means 15. Similarly, a high-frequency signal voltage $U_4$ from a standard source 13, such as a quartz oscillator, is fed to the input terminal of frequency divider means 14 via a normally conductive second gate 32, said frequency divider means being operable to produce from the high frequency input signal a standard frequency pulse signal $U_5$ of relatively low frequency, generally similar to that of the filtered clock signal. Flip-flop 15 is alternately switched from one state to the other by the clock and standard frequency pulses $U_2$ and $U_5$, respectively, to produce a series of rectangular pulses $U_6$ of constant magnitude, the duration of said pulses being a function of the interval of time between each clock pulse and the associated standard frequency pulse. The rectangular pulses $U_6$ are transformed by the sawtooth waveform generator means (which functions as a voltage-time transformer) into trapezoidal sawtooth pulses $U_7$ the magnitude of which corresponds with the duration of the rectangular pulses $U_6$ (and, consequently, the time intervals between the clock pulses and their associated standard frequency pulses, respectively). The sawtooth voltage pulses are added by the integrating storage means 17 to produce a resultant control voltage $U_8$ that is applied to the driving coil 21 of the pointer 22 of the meter 2. The pointer 22 is displaced in opposite directions from the zero point on scale 23 as a function of the magnitude and sense of the rate of the timepiece. When the indicator reaches the end of the scale 23, a so-called "phase jump" occurs, since the time interval between the clock pulse and the standard frequency pulse changes from its maximum duration to zero. However, this phenomenon is not taken into account during the further observation of the indicating, and also it is not shown in FIG. 2. On the other hand, when an apparatus of this type is being assembled, the measuring means should not be damped too strongly for the new setting on the other end of the scale to be reached sufficiently rapidly. Such a demand can be fulfilled easily by appropriate design of the storage device 17 (as proposed, for example, in the Swiss Patent No. 507,552). The same applies also wth regard to interference pulses which possibly may arise due to ambient noise.

When the timepiece is perfectly regulated, the indicator stands on the scale, and if the timepiece is losing, it travels from right to left. Consequently, the phase jump, if any, is from left to right.

While the disclosed method affords a rough estimate of the rate of the timepiece, it does not afford a numerical indication of rate (for example, in "seconds/per day"). In accordance with the present invention, the indicator apparatus 2, in addition to being provided with the usual setting knobs for clock beat numbers and sensitivities, is also provided with an operating key 24 whose switchover contact 33 is shown at the top right-hand side of the diagram, for the purpose of greater clarity. The scale 23 and the measuring means 21, 22 have their zero point in the middle, and adjacent thereto — or at any rate, within slight-range of the scale — is located a lamp 25 by means of which an electronic timer 34 signals the end of the observation time in question in each case, for read-off purposes. More particularly, the switch means 33 includes a movable contact that is connected with the voltage source V and is displaceable (at time A on curve $U_3$) from the illustrated first position toward a second position to apply switching potentials to flip-flops 35, 36, 37 and 15, and conditioning potentials to the frequency divider 14 and to the normally disabled timer 34. Gates 31 and 32 are thus rendered non-conductive to interrupt the supply of clock and standard frequency pulses to the waveform generator 16, and owing to the switching of flip-flop 37, timer 34 is placed in an enabled condition.

At the end of a first time interval (point B on curve $U_3$), switch means 33 is returned to the first position to reset flip-flop 35 and to render conductive gate 31, whereupon the next clock pulse C is transmitted both to flip-flop 37 to initiate the formation of a rectangular pulse $U_6$ and corresponding sawtooth pulses $U_7$ and $U_9$. Connected between the input terminal of storage means 17 and the quenching input Q of flip-flop 36 is a normally non-conductive synchronizing circuit 38 the level of which corresponds with the zero set point of the indicating meter 2. Consequently, when the voltage of the rising sawtooth pulse equals the zero set point voltage of meter 2 (i.e., point D on curve $U_7$ of FIG. 2), synchronizing circuit 38 becomes conductive to discharge to flip-flop 36 the capacitive component of storage means 17, whereupon the state of flip-flop 36 is altered to render conductive the gate 32, thereby producing a standard frequency pulse $U_5$ in proper synchronism with the time D at which the sawtooth voltage pulse $U_7$ attained the zero set point voltage of the meter 2. Subsequent clock and standard frequency pulses produce sawtooth pulses $U_7$ the magnitude of which correspond with the time intervals between the clock and standard frequency pulses. These sawtooth pulses are integrated by the storage means 17 to produce a cumulative resultant signal $U_8$ that is indicated on the meter 23. The reading on scale 23 (which is calibrated, for example, in seconds) indicates the magnitude and sense of the rate of the timepiece from the desired value, and at the end of the time period set by the timer 34, indicator light 25 is illuminated. By appropriate calibration of the system variables, the scale reading at this instant is a direct numerical indication of the rate (for example, in seconds/day) of the timepiece.

It is important to note that owing to the conditioning circuitry associated with switching means 33, key 24 may be operated at any time (for example, during the processing of clock or standard frequency signals, or during the occurrence of a phase jump when the pointer reaches an end limit of travel on the scale).

The maximum error in this synchronization system amounts (apart from switching times) only to a period of the standard frequency signals $U_4$ which mostly, anyway, for the purpose of beat-number switchover possibility, has to be selected as a high frequency above approximately 10 kHz. The uncertainty of the rate-indication, conditioned thereby, thus no longer comes into consideration, in relation to the other instrument errors.

While in accordance with the provisions of the Patent Statutes, the preferred form and embodiment of the invention has been illustrated and described, it will be apparent to those skilled in the art that various changes and modifications may be made in the described apparatus without deviating from the inventive concept.

What is claimed is:

1. Apparatus for indicating the rate of a timepiece, comprising
   a source of clock pulses ($U_2$);
   a source of standard frequency pulses ($U_5$);
   waveform generator means (16) for producing for corresponding pairs of said clock and standard frequency pulses sawtooth voltage pulses ($U_7$) the magnitudes of which are a function of the time intervals between said clock and standard frequency pulses, respectively;
   storage means (17) for integrating said sawtooth voltage pulses to produce a resultant signal voltage ($U_8$) the magnitude of which is a function of the sum of said sawtooth voltages;
   meter means (2) connected with said storage means for indicating the magnitude of said resultant voltage;
   means (33) for interrupting the supply of said clock and standard frequency pulses to said waveform generator means;
   means (35, 33) operable after a given first time interval (A-B) for reconnecting said source of clock pulses with said waveform generator means;
   timer means (34) activatd upon the occurrence of the next clock pulse (c) following said first time interval;
   voltage comparison synchronizing means (38) operable when the voltage of the sawtooth pulse associated with said next clock pulse reaches a value (D) corresponding with he zero set point of said pointer for discharging said storage means and for reconnecting said source of standard frequency pulses with said waveform generator means, whereby said storage means resumes integration of the succeeding sawtooth pulses; and
   means (25) operable by said timer means after a second time interval for providing a visual indication adjacent said meter, whereby the instantaneous meter reading at the end of said second time interval is a direct numerical indication of the rate of said timepiece.

2. Apparatus as defined in claim 1, wherein said sources of clock and standard frequency pulses include normally-conductive first (31) and second (32) gate means, respectively; and
   further wherein said means for interrupting the supply of said clock and standard frequency pulses includes switch means (33) operable from a first position to a second position to render said gate means non-conductive.

3. Apparatus as defined in claim 2, wherein said source of standard frequency pulses includes a source (13) of high frequency signals, and frequency divider means (14) for transforming said high frequency signals into low frequency pulses.

4. Apparatus as defined in claim 3, wherein said second gate means (32) is connected between said source of high frequency signals (13) and said frequency divider means.

5. Apparatus as defined in claim 2, wherein said pulse interrupting means further includes first (35) and second (36) flip-flop means connected between said switch means and said first and second gate means, respectively.

6. Apparatus as defined in claim 5, and further including third (15) and fourth (37) flip-flip means connected between the output of said first gate means and the inputs of said waveform generator means and said timer means, respectively, said third flip-flop means having a further input connected with said source of standard frequency pulses for alternately connecting said sources with said waveform generating means.

7. Apparatus as defined in claim 1, wherein said meter means includes an indicator movable in opposite senses from a zero central position in accordance with the magnitude and the sense of the rate of the timepiece.

8. The method of operating the integrating meter of a timepiece testing system to indicate the rate of a timepiece, said meter being normally operable to integrate sawtooth voltage pulses the amplitude of which correspond with the time intervals between corresponding clock and standard frequency pulses, respectively, comprising the steps of interrupting the supply of clock and standard pulses to said meter;

resuming the supply of clock pulses to said meter after a first time interval (A-B);

initiating a second time interval upon the occurrence of the next clock pulse (C);

resuming the supply of standard frequency pulses when the voltage of the sawtooth pulse corresponding with said first clock pulse equals a given valve (D) corresponding wth the zero set point of the meter; and reading the meter indication at the end of said second time interval, whereby said meter reading is indicative of the rate of the timepiece under test.

* * * * *